United States Patent [19]

Murphy

[11] Patent Number: 4,487,196

[45] Date of Patent: Dec. 11, 1984

[54] FOCUSING SOLAR COLLECTOR AND METHOD FOR MANUFACTURING SAME

[75] Inventor: Lawrence M. Murphy, Lakewood, Colo.

[73] Assignee: The United States of America as represented by the United States Department of Energy, Washington, D.C.

[21] Appl. No.: 440,193

[22] Filed: Nov. 8, 1982

[51] Int. Cl.³ ............................................. F24J 3/02
[52] U.S. Cl. .................................. 126/438; 350/607; 350/631
[58] Field of Search .................. 126/438, 439, 451; 350/97, 100, 101, 104, 107, 108, 288, 289, 309, 310, 306

[56] References Cited

U.S. PATENT DOCUMENTS 3,973,834  8/1976  Penn et al. ........................ 350/310
4,318,394  3/1982  Alexander ...................... 350/288 X
4,373,783  2/1983  Anderson ....................... 350/292 X Primary Examiner—Larry Jones
Attorney, Agent, or Firm—Kenneth L. Richardson; John M. Albrecht; Michael F. Esposito

[57] ABSTRACT

Disclosed is a solar collector comprising an annular-shaped frame and a composite membrane member for concentrating and focusing sun radiation. The composite membrane member is supported and tensioned by the frame and consists of first and second differentially pretensioned sheet members which are integrally bonded to one another. The frame and one of the two sheet members are adapted to allow tensions in both of the sheets to be adjusted. Subsequent to bonding and upon adjusting a tension in one of the two sheet members, both of the two bonded sheet members react with one another so as to cause the composite membrane member to have a contoured configuration, which enables the membrane member to be focusable. Additionally, adjusting the tension in one of the two sheet members provides a reciprocal adjustment in a focus provided by the membrane member.

20 Claims, 7 Drawing Figures

FOCUSING SOLAR COLLECTOR AND METHOD FOR MANUFACTURING SAME

CONTRACTUAL ORIGIN OF THE INVENTION

The United States Government has rights in this invention pursuant to Contract No. EG-77-C-01-4042 between the U.S. Department of Energy and the Midwest Research Institute.

BACKGROUND OF THE INVENTION

1. Field of the Invention

The present invention relates generally to solar collectors, and more particularly to a stretched membrane-type variable focusing collector and a method for manufacturing same.

2. Description of the Prior Art

Recent developments in the solar collector art include a trend toward manufacturing reflectors for concentrating solar collectors with thin flexible lightweight reflector materials. Examples of such lightweight reflector materials are thin metallic sheets of steel or aluminum which are often called foils. Collectors manufactured from these materials are commonly referred to as stretched membrane solar collectors. Generally speaking, a solar collector consists of a reflector and metal-constructed reflector support frame. The reflector is typically in the form of a mirror or plurality of mirror segments.

Individual solar collectors are frequently employed in an array to concentrate solar radiation severafold by reflecting and focusing the solar radiation onto an absorber/receiver. Solar radiation is commonly known as sunlight and, generally speaking, concerns electromagnetic radiation and particles emitted by the sun. The absorber/receiver which may be a cavity-type is positioned at a focal area of the array so as to absorb maximum heat energy.

The focal area, broadly speaking, concerns a point or region to which the collector reflects all incident sun radiation. The solar energy flux received and absorbed by the receiver/absorber is usually carried away by a suitable heat transfer fluid to either operate a thermodynamic heat engine or to provide process heat. Solar energy flux generally means energy flux transmitted from the sun, which is in the form of electromagnetic radiation.

The trend toward producing lightweight solar collectors is dictated in part by high manufacturing costs of glass/metal-type reflectors. This trend is also dictated in part by the heavyweight of glass/metal-type heliostat reflector panels. A heliostat may be simply defined as a tracking mirror. To continue, the reflector panels and support structure are often fabricated from thick heavy metal, glass and composite materials in order to have them meet strength and rigidity requirements imposed by the heliostat performance. Speaking more specifically, such strength and rigidity is frequently required in order to give the panel the capacity to withstand environmental loads without undergoing warping, buckling, or fracturing which eventually could lead to failure, as well as being required to maintain optical accuracy. Examples of such environmental loads are gravity loads, wind loads, and ice/snow loads.

Unfortunately, the heavy deadweight load of the reflector and the reflector support panel frequently produces stresses and deformations in the heliostat which undesirably add to the harmful stresses produced by environmental loads. Additionally, the use of heavy structural elements and metal materials to add sufficient strength and ridigity so that the heliostats can sustain such loads is one major reason for their undesirably high manufacturing costs.

In addressing the disadvantages associated with heavyweight collectors by producing collectors which employ substantially thinner and lighter weight materials, a problem has developed in shaping and tensioning the stretched reflector surface thereof. It has often been extremely difficult to shape and tension a stretched membrane-type reflector surface such that it produces an acceptable focal spot at the absorber/receiver cavity with minimal unabsorbed surface reflected solar flux and associated radiant and convection energy losses. Radiant and convection losses concern solar energy that is lost by the receiver/absorber after the solar radiation is absorbed. The concept of radiant and convection losses become even more significant when it is realized that the characteristics of a stretched reflector surface and a focus provided thereby may be utilized to reduce such losses.

With regard to such reflector characteristics and reflector focus, a stretched reflector surface will generally have a gravity induced focal length which is a function of a reflector elevation angle and a surface tension. Additionally, the focus of the collector depends to a large extent on sizing and centering the reflector surface with a certain surface configuration and a resulting surface angle defined thereby. Normally, increasing the tension of the stretched reflector surface increases the focal length. The ideal focal length is equal to a slant range from the reflector to the absorber/receiver cavity. The aforesaid characteristics of stretched reflector surfaces can be used to enhance collector system performance by reducing the size of the image at the receiver and therefore the amount of energy spillover.

Additionally, a problem has developed in providing lightweight collectors with variable or adjustable focusing capabilities such that the collector can be used to produce various concentration ratios to meet specific collector site requirements. Concentration ratios concern the ratio of an intensity of solar light impinging on the absorber/receiver to that of the solar light impinging on the collective surface of the collector. Notably, these ratios may be as small as one for no concentration to as high as several thousand. Yet another problem concerns producing a lightweight collector that is capable of withstanding wind induced deflections of the collector surface with minimal deterioration of the collector focus.

To cope with the aforesaid problems, the reflector surfaces of some solar collectors have been designed by tensioning a sheet of aluminized Mylar over a plurality of elongated supporting members. The supporting members function to impart a caternary configuration to the aluminized sheet. A prior art patent relating to such a design is U.S. Pat. No. 4,173,397. Unfortunately, however, this prior art design as well as others have suffered from one or more shortcomings. For example, this earlier design is unduly complex and comprises a number of component parts and its focus is not easily controllable.

Some prior art designs have stretched a sheet of aluminized Mylar over the top of a hollow cylinder and reduced the pressure therein between to provide a desired surface configuration. An example of this design is disclosed in U.S. Pat. No. 4,288,146. However, unfortunately, this design may result in a proneness to develop leaks and changes in the pressure within the cylinder. Such leaks may, in turn, lead to undesirable and irreversible degradation of the collector focus. It will be noted that the use of a vacuum pump to maintain the desired pressure has to some degree been partly helpful in reducing some aspects of the problem with pressure leakage. However, such a pump is an additional cost element and is power consuming.

Some prior art designs use flat surface-type collectors. In flat surface-type collectors the reflected sunlight radiation is aimed rather than focused at the absorber/receiver cavity. Flat surface-type collectors, however, when employed in applications where high intensity ratios are desired, often produce an unacceptably enlarged focal region at the receiver as a consequence of spreading of the reflected incident sunlight beam, as well as to produce a related unwanted drop in optical efficiency. Optical efficiency generally concerns a measurement of a fraction of the sun energy that actually reaches the absorber/receiver cavity.

SUMMARY OF THE INVENTION

Against the foregoing background, it is a general object of the present invention to provide an improved lightweight stretched membrane-type variable focusing solar collector and method for manufacturing the same which overcomes many of the aforedescribed shortcomings and disadvantages of the prior art lightweight solar collectors.

It is another general object to provide a lightweight stretched membrane-type variable focusing solar collector which in certain embodiments uses only inexpensive readily available materials and components that can be easily and cheaply manufactured.

It is a more specific object to provide a lightweight stretched membrane-type variable focusing solar collector with either a parabolic or spherical reflector surface.

It is another more specific object to provide a lightweight stretched membrane solar collector having a focus that is capable of being adjusted to produce various concentration ratios and to meet specific collector site requirements.

It is yet and still an object to provide a lightweight stretched membrane-type variable focusing heliostat which is capable of withstanding deflections thereof caused by high winds with minimal degradation of its focus.

The above objects, as well as still further objects and advantages, are attained by the present invention which may be described briefly as a solar collector comprising an annular-shaped frame and a composite membrane member for concentrating and focusing sunlight. The composite membrane member is supported and tensioned by the frame and consists of first and second differentially pretensioned sheet members which are integrally bonded to one another. The frame and one of the two sheet members are adapted to allow the tensions in both of the sheet members to be adjusted. Subsequent to bonding the two sheet members and upon adjusting a tension in one of the two sheet members, both of them react with one another so as to cause the composite membrane member to be focusable. Additionally, adjusting the tension in one of the two sheet members provides a reciprocal adjustment in a focus provided by the composite membrane member.

Additional objects, advantages, and novel features of the present invention will be set forth in part in the detailed description which follows, and in part will become apparent to those skilled in the art upon examination of the following description or upon practicing the invention. The objects and advantages of the invention may be realized and obtained by means of the elements and the combination of elements particularly pointed out in the appended claims.

BRIEF DESCRIPTION OF THE DRAWINGS

The accompanying drawings, which are incorporated in and form a part of the specification, illustrate preferred embodiments of the present invention and together with the description serve to explain the principles of the invention. In the drawings:

FIG. 3 is a partly broken, cross-sectional, enlarged, detailed view illustrating an expander member seated within an offset of a reflector support frame of the variable focusing stretched membrane solar collector of FIG. 1.

DETAILED DESCRIPTION OF THE PREFERRED EMBODIMENTS

Figure 1:
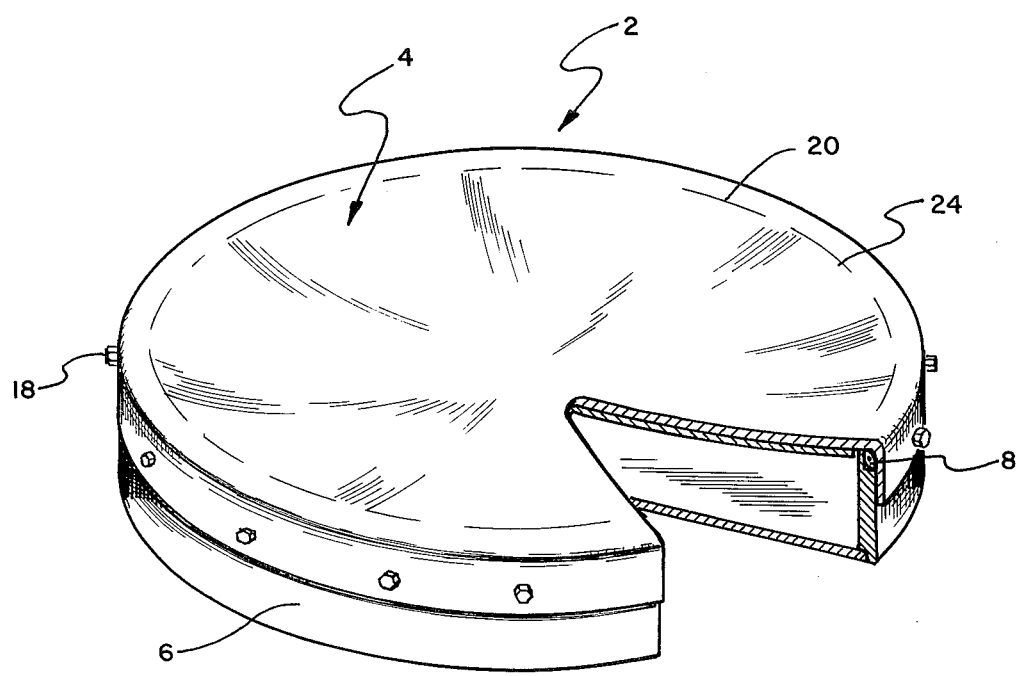
FIG. 1 is a partly broken perspective view of a variable focusing stretched membrane solar collector constructed in accordance with the principles of the invention.
Figure 2:
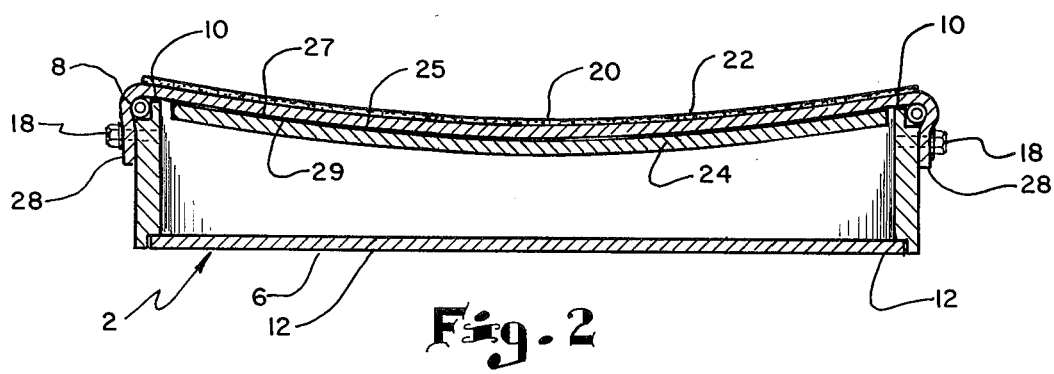
FIG. 2 is a cross-sectional view of the variable focusing stretched membrane solar collector of FIG. 1.
Figure 4:
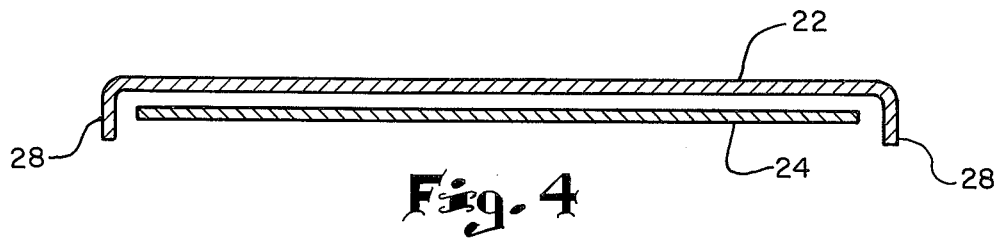
FIGS. 4, 5, and 6 are enlarged, side views illustrating the membrane of the focusing solar collector of FIG. 1 without the membrane support frame thereof at various stages of the collective surface bending operations.
Figure 5:
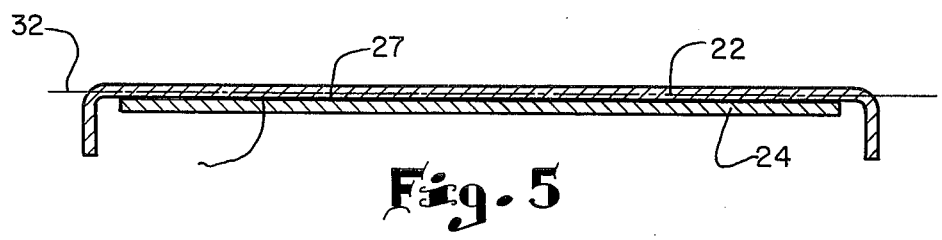
Figure 6:
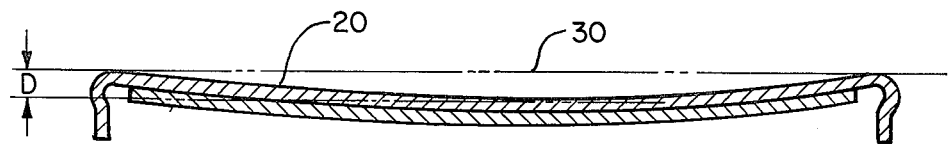

Referring initially to FIGS. 1 through 3, there is illustrated a preferred form of a lightweight stretched membrane-type variable focusing solar collector 2, constructed in accordance with the invention. Generally speaking, the collector 2 may be employed in numerous applications where a reflector or collector surface is required to retrieve power from solar energy. Examples of such applications are parabolic trough collectors, heliostat and parabolic dish collectors, and flat plate collectors. The collector 2 generally includes a composite-type membrane member 4 and a collector membrane support frame 6. Collector 2 may also include an expander member 8.

In the present instance, the frame 6 is provided with a generally cylindrical shape, is formed from a metal material, and generally functions to support and tension the membrane member 4. It will be understood that although the preferred shape of frame 6 is cylindrical, the frame 6 is not limited thereto and may comprise other shapes as will occur to those skilled in the art, such as for example, a polygonal shape. The frame 6 is also provided with opposed top and bottom ends or sides 10, 12, respectively. The top side 10 is provided with a generally L-shaped offset 14 which seats therein the expander 8, as is most clearly shown in FIG. 3.

The expanded member 8 in the present instance consists of an inflatable watertight and airtight tubular-shaped bladder. The expander 8 may be formed from any material suitable for holding air or liquid under pressure, such as for example, a rubber material. Expander 8 generally functions to initially pretension one or more component sheet members of membrane member 4, which pretensioning is generally accomplished by mounting the sheet members to frame 6 and subjecting them to pressurized air or liquid via an inlet valve 16 thereof, as will be more fully explained hereinafter. It will be appreciated that the term pretensioning is meant to concern the tensioning of the sheet members subsequent to the bonding operation.

The composite membrane member 4 generally functions as a stretched variable focusable surface. In the illustrated form, the membrane member 4 is suspended from frame 6 through conventional fasteners 18, such as for example, nuts and bolts. The composite membrane member 4 includes an outer layer or film of a reflector material 20, upper and lower fairly thin resiliently elastic sheet members 22, 24, respectively, and an intermediate layer of bonding material 25.

Referring initially to the sheet members 22, 24, the sheet members 22, 24 are generally of uniform thickness, are generally planerly-shaped before being attached to frame 6, and are of a suitable strength to be safely tensioned loaded for all normally anticipated optical performance requirements. With regard to the present invention, optical performance requirements are meant to concern providing the collector 2 with a desired surface contour that produces a variable focus, which focus effectively images the sun so as to enable the reflector surface to efficiently obtain a wide range of desired solar intensity ratios and high recovery values of the incident solar energy. A lower inner facing surface 27 of the top sheet 22 is positioned contiguously with an upper inner facing surface 29 of the bottom sheet 24 and is bonded integrally therewith to effect a unitary structure.

The adhesive layer of bonding material 25 is fairly thin, that is to say on the order of around about 0.00254 mm (0.001 in.), and in addition to holding the two sheets 22, 24 together, it also serves to transmit the loads thereon in shear, as will become more fully apparent hereinbelow.

The layer of reflector material 20 functions as the reflector surface for collector 2. The reflector surface 20 may be fabricated from any number of well-known plastics, both thermoplates and thermosets, which are capable of meeting the mechanical property requirements and optical performance requirements for providing satisfactory reflector surface operations. Examples of such plastics are aluminized polyesters and silverized polycarbonates. Additionally, the reflector surface may be fabricated from metallic materials such as spray silver.

Two preferred types of reflector materials are FEK 244 and YS91. FED 244 and YS91 are trademarks for aluminized polyester films. Both FEK 244 and YS91 are manufactured by 3M Corporation, Minneapolis, Minnesota.

Any number of well-known techniques may be employed to apply the reflector surface layer 20 to the upper sheet 22. Examples of such techniques are direct metallization, mold-in-films and lamination of films. A preferred technique for applying the reflector layer 20 to sheet 22 is the lamination of films technique. In view of the aforesaid, it will be appreciated that a preferred thickness of layer 20 is on the order of around about 0.05 mm (0.002 in.). It will be further appreciated that a preferred thickness of the upper sheet 22 is in a range of from around about 0.25 mm (0.010 in.) to around about 0.50 mm (0.020 in.).

In the fabrication of the collector 2, as is best shown in FIGS. 3, 4, 5, and 6, the expander 8 prior to being pressurized is initially placed within the offset 14. Thereafter, the top sheet member 22 is connected to frame 6 with fasteners 18 such that the sheet 22 is suspended therefrom and is provided with a shape defined by a circumference of frame 6. Thus, for example, when the frame 6 comprises a cylindrical shape, like in the present instance, the boundary of the mounted sheet 22 assumes a circular shape.

Thereafter, the expander 8 is employed to pretension the mounted top sheet member 22. Top sheet member 22 is tensioned in a manner to allow it to be assumed to be in a uniform state of plane stress. Generally speaking, a state of plane stress exists in a thin-stretched membrane, such as the top sheet 22, when the stresses induced therein are substantially all parallel to one plane. In this regard, plane stress is produced in the mounted top sheet 22 by submitting it to the action of tension forces applied uniformly and symmetrically at the boundary 28 thereof. The tension forces are applied by inflating expander 8 with either pressurized air or liquid. The applied tension forces are parallel to an imaginary plane 32 passing therethrough and are distributed uniformly over its thickness, except near the peripheral edges of the boundary 28.

It will be noted that the significance of being able to assume that the resulting stretched sheet 22 is in a uniform state of plane stress is that it advantageously greatly simplifies problems in stress analysis pertaining to the magnitudes at which the top sheet 22 will be tensioned, as will be more fully described hereinafter. It will be further noted that the magnitude of the stretching forces required to uniformly pretension the top sheet 22 for most anticipated focusing collector applications is in the range of from about some valve greater than zero to about 270 kilograms (150 pounds) per inch along the boundary 28.

Thereafter, both of the sheets 22, 24 are positioned with respect to one another such that they may be integrally bonded together while in a differentially pretensioned state to effect forming the unitary composite structure of the membrane member 4. To accomplish bonding the two sheets 22, 24 in a differentially pretensioned state, the bottom sheet 24 is juxtaposed with the mounted and tensioned top sheet 22 such that the magnitude of pretension stresses induced in the lower sheet 24 are usually kept at a minimum. In this regard, it is contemplated that the bottom sheet 24 may be pretensioned to any predetermined magnitude or value that is less than a predetermined magnitude to which the top sheet 22 is tensioned to obtain a contoured surface which meets the design optical performance requirements. A preferred value of the pretension that is induced in the bottom sheet 24 is zero.

A value of zero is preferred because at this magnitude the amount of work involved in shaping the reflector surface 20 is significantly reduced. More particularly stated, since most desired reflector surface contours may be obtained with the value of the tension in the bottom sheet at zero, the separate operation of pretensioning the bottom sheet 24 prior to bonding may, in most instances, be eliminated.

Incidentally, it will be noted that in arranging the two sheets 22, 24 for bonding, the bottom sheet 24 is not attached to the frame 6, and hence it is also not submitted to the stretching action of the expander 8. This is because it is contemplated that tensioning means other than the expander member 8 will be utilized in those instances where it is desired to pretension the bottom sheet 24 to some value greater than zero. In such instances, the bottom sheet 24 could be pretensioned, for example, by using well-known thermal mismatch techniques or mechanical tensioning techniques.

Upon arranging the two sheets 22, 24 in a differentially pretensioned configuration, both sheets 22, 24 are integrally bonded together to effect forming the unitary composite structure of the membrane member 4.

Thereafter, the expander 8 is depressurized to effect releasing a predetermined amount of tension in the top sheet 22. In response to depressurizing the expander 8 and the resulting release of tension in the top sheet 22, the top sheet 22 contracts. As the top sheet 22 contracts, the bottom sheet 24 exerts a counteracting force on the top sheet 22 which resists its elastic contraction.

In the resulting state of reactions, the counteracting resistance of the bottom sheet 24 to the contraction of the top sheet 22 causes the unit membrane member 4 to symmetrically deflect or curve and set in a desired dish or concave configuration. Due to this deflection, the top sheet 22 remains in tension but at a lower level than the pretension level, and the bottom sheet 24 is caused to be in compression. It is also noted that the resulting differential loading and corresponding curvature charge induces bending stresses across the load carrying faces.

The actual shape and size of the deflection D produced in the membrane member 4 depends on numerous factors. Examples of such factors are the mechanical properties of the manufacturing materials used to fabricate the membrane member 4, the intensity of the contractive reactions of the bonded top sheet 22, and the intensity of the counteracting resistance offered by the bonded bottom sheet 24. These intensities, in turn, depend on the predetermined magnitudes to which the two sheets 22, 24 are differentially pretensioned. Similarly, the strength and rigidity of the membrane member 4 and its ability to adequately withstand wind loads also depends, in part, on the same aforementioned factors.

It is contemplated that in most anticipated variable focusing collector applications, the depth of the deflection D, that is to say the distance from an imaginary plane 30, defined by the highest most regions of the reflector surface 20 to the lower most region thereof, will vary from a range of from around about 0 mm to around about 50 mm (2 in.). For example, in large 100 megawatt heliostat systems a deflection of only about 3 mm (0.118 inches) is needed in some of the heliostats of an array thereof to provide an acceptable focus.

In view of the aforesaid, it will be apparent that the reflector surface 20, may be formed with various deflection depths, reflector surface tensions and surface contours, as well as with various focal lengths, and thereby with controlled focusing by generally differentially pretensioning the sheets 22, 24 at predetermined magnitudes suitable for producing one or more of the above desired results. Examples of some reflector surface contours obtained by differentially pretensioning the sheets 22, 24 as aforedescribed are a spherically-shaped reflector surface which very closely approximates a parabolically-shaped reflector surface and a circular cylindrically-shaped reflector surface which very closely approximates a linear parabolically-shaped reflector surface. With regard to the linear parabolically-shaped reflector surface, it will be understood that such contours are formed with rectangular-shaped frames by uniformly and symmetrically pretensioning the top sheet member 22 at two opposed portions or sides thereof, as opposed to equally pretensioning the top sheet member 22 along the entire circumference or boundary 28.

With regard to focusing of the contoured reflector surface 20, it is a feature of the present invention that the collector focus may be varied or adjusted. Adjustment of the focus is accomplished by changing the tension in the top sheet 22 of the membrane member 4 subsequent to its deflection. Changing the tension causes a reciprocal change in the existing state of reactions in the previously deflected membrane member 4, and consequently a change in the original focus associated therewith.

It is another feature of the invention with regard to focusing that the contoured membrane member 4 is capable of adequately withstanding wind induced deflections with minimal degradation of the focus. Preventing such degradation is accomplished by selecting reflector materials that are of a suitable strength and rigidity to withstand such deflections and an associated deterioration of the focus after they are bent to the desired contour, as well as accomplished by appropriate design. Steel, aluminum and high strength polymer foils are examples of such materials. It is contemplated that the collector 2 will satisfactorily perform in winds of up to about 30 miles per hour.

With regard to wind loads, it will be noted that the differential pretensioning leads to two compensating responses under applied wind loading. Such responses occur because wind loading tends to increase the deformation of the deflected membrane member. But increasing the deformation, increases the tension in the membrane member. However, since increasing the membrane tension decreases the deformation, the effects will be partially offset, which can eventually lead to reduced support frame weight and cost.

In addition to the above, it will be appreciated, that after the membrane member 4 is caused to deflect the expander member 8 is not required to maintain the contour of the reflector surface 20 or the focus associated therewith. In fact, after causing the membrane member 4 to deflect the expander member 8 may even be removed from the frame 6 with substantially no deterioration of the reflector surface contour or its focus. The expander member 8, however, is required if it is desired to change the surface contour.

In view of the aforesaid, it will now be further appreciated that one important aspect of the pretensioning operation, as well as the bonding and surface shaping operations is that upon pretensioning selected ones of the component sheet members to a uniform state of plane stress and upon bonding them and causing them to react with one another, the resulting composite membrane 4 behaves as a uniformly loaded clamped-edge membrane. As a consequence of the composite membrane 4 behaving as a uniformly loaded clamped edge-membrane, bending stresses associated with pretensioning can be neglected when performing stress analysis in accordance with the well-known membrane theory for plates and shells. Thus, design problems in stress analysis to predetermine the extent to which the composite membrane 4 must be tension-loaded in order to obtain a desired collector surface contour or angle and its associated focal point are advantageously greatly simplified, as previously mentioned.

Attention is now drawn to the fact that the lightweight stretched membrane-type variable focusing collector 2 of the present invention has several advantages over earlier similar collector types in that: the collector 2 is a simply constructed low-cost lightweight collector with variable and controlled focusing; the collector 2 is capable of withstanding deflections caused by high winds with minimal degradation of the focus associated therewith, and no special techniques or devices are required in order to maintain the desired surface contour or its focus.

Figure 7:
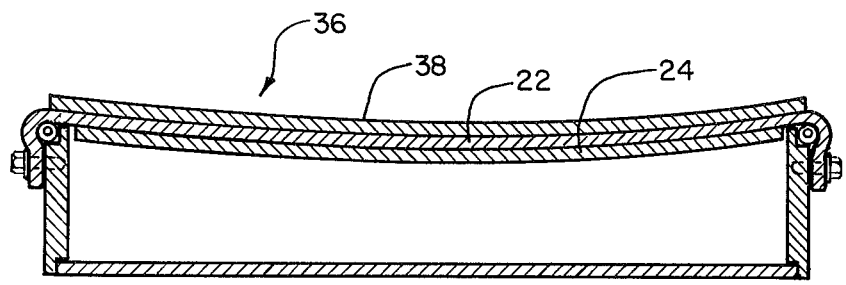
FIG. 7 is a view similar to FIG. 1, but illustrating a variant of the embodiment of the variable focusing stretched membrane solar collector of FIG. 1.

In keeping with the invention, various changes and modifications to the particularly disclosed embodiments will be apparent to those skilled in the art and eventually may be made without departing from the spirit and scope of the invention. By way of example, there is illustrated in FIG. 7 a variant of the embodiment of FIG. 1 wherein the membrane member, which in this instance is denoted by the reference character 36, comprises a plurality of sheet members as opposed to only comprising a pair of sheet members. It will be noted that this inventive feature is generally the only difference between the embodiments of FIGS. 1 and 7.

With regard to the aforesaid difference, a third layer of reflector material 38 has been bonded to the top surface of sheet 22. Notably, since the third sheet consists of an upper layer, it will be in compression after bonding. It will be apparent that if the third layer is disposed at the lower surface of the sheet 24, it must be formed of a material that is capable of remaining in tension after being applied thereto. In this instance, the third layer 38 consists of silvered-mirrored glass and the compression state thereof is a desirable feature. The thickness of the mirror 38 must, in general, be less then; the bottom sheet, or such that the curvature of the composite membrane will be concave with respect to the absorber/receiver at which it is focused.

The present examples and embodiments, therefore, are to be considered in all respects as illustrative and restrictive and the invention is not to be limited to the details given herein but may be modified within the scope of the appended claims.

The embodiments of the invention in which an exclusive property or privilege is claimed are defined as follows:

1. A solar collector comprising:
   a. a frame; and
   b. a composite membrane member for concentrating and focusing sunlight, said composite membrane member being supported and tensioned by said frame, said composite membrane member comprising first and second differentially pretensioned sheet members, one said sheet member of said first or second sheet members overlying the other of said first or second sheet members, said first and second sheet members being integrally bonded to one another, said frame and one of said two sheet members being adapted to allow tensions in both of said two sheet members to be adjusted so as to cause said membrane member to have a contoured configuration, said contoured configuration enabling said membrane member to be focusable, and wherein an adjustment of said tension in one of said two bonded sheet members provides a reciprocal adjustment in a focus provided by said membrane member.

2. A solar collector as recited in claim 1, wherein said sheet members are adapted such that adjustment of said tension in one of said two sheet members causes said membrane member to deflect, and wherein upon deflecting, said first sheet member and said second sheet member subject one another to counteracting forces such that one of said sheet members is caused to be in tension and the remaining one is caused to be in compression.

3. A solar collector as recited in claim 2, wherein one of said first or second sheet members define a reflector surface, said one of said first or second sheet members defining said reflector surface being in tension.

4. A solar collector as recited in claim 3, wherein said first sheet member is in said tension, said first sheet member comprising an upper layer of said membrane member, said second sheet member comprising a bottom layer of said membrane member, and said second sheet member being in said compression.

5. A solar collector as recited in claim 3, wherein said focus is adjusted by reducing a tension in said first sheet member subsequent to said bonding.

6. A collector as recited in claim 1, wherein said sheet members are further adapted such that adjustment of said tension in one of said two sheet members causes said membrane member to undergo a symmetrical deflection.

7. A collector as recited in claim 6, wherein a depth of said deflection varies in a range of from around about 0 mm to about 50 mm with respect to a horizontally extending planerly surface defined by upper regions of said frame.

8. A solar collector as recited in claim 7, wherein said membrane member is from around about 0.25 mm to about 0.5 mm thick.

9. A solar collector as recited in claim 6, wherein said membrane member defines a reflector surface, and said deflection of said membrane member providing said reflector surface with a dish shape.

10. A solar collector as recited in claim 6, wherein said membrane member defines a reflector surface, and said deflection of said membrane member providing said reflector surface with a spherical shape.

11. A solar collector as recited in claim 6, wherein said membrane member defines a reflector surface, and said deflection of said membrane member providing said reflector surface membrane with a parabolic shape.

12. A solar collector as recited in claim 1, wherein said frame is formed from a substantially rigid material.

13. A solar collector as recited in claim 12, wherein said frame comprises a metal material.

14. A solar collector as recited in claim 13, wherein said membrane member is releasably supported by said frame at peripheral edge portions thereof such that said membrane member is suspended therefrom.

15. A solar collector as recited in claim 1, wherein said membrane member is a fairly thin elastic composite material of uniform thickness.

16. A solar collector as recited in claim 1, wherein said membrane member is of sufficient strength to satisfactorily resist wind induced deflection relative to said frame and to provide a satisfactory focus with minimal deterioration in winds of up to about 30 miles per hour.

17. A solar collector as recited in claim 1, further comprising an expander member for uniformly adjustably pretensioning in at least one of said two sheet members, said expander being disposed between said membrane member and said frame.

18. A method for forming a stretched membrane-type variable focusing collector, said method comprising:

(a) disposing a first planerly-shaped material on a cylindrically-shaped frame, said first material being suitable for use in solar concentration applications;

(b) tensioning said first material on said frame to a first predetermined magnitude;

(c) juxtaposing a second planerly-shaped material with said first material;

(d) maintaining a value of a tension in said second material to a minimum;

(e) bonding said first and second materials to effect therefrom an integral unitary composite member; and (f) reducing a portion of said tension in said first material to effect providing said composite member with a contour which allows focusing of said collector.

19. A method as recited in claim 18, wherein said first material is tensioned to a greater magnitude than said second material.

20. A method as recited in claim 19, wherein said first material contracts in response to said reducing of a portion of said tension therein, said second material being induced by the action of said first material to resist said contraction, and wherein the resistance of said second material to the contraction of said first material causes said composite member to bend and set into a desired predetermined dish-shaped configuration which allows said composite member to be said focusable.

* * * * *